United States Patent
Yu et al.

(10) Patent No.: US 10,352,464 B2
(45) Date of Patent: Jul. 16, 2019

(54) STRUCTURE OF ENERGY-SAVING PRECISION PRESSURE ADJUSTING VALVE

(71) Applicant: TAIWAN CHELIC CO., LTD., New Taipei (TW)

(72) Inventors: Ping-Cheng Yu, New Taipei (TW); Chih-Sheng Cheng, New Taipei (TW)

(73) Assignee: TAIWAN CHELIC CO., LTD., New Taipei (TW)

( * ) Notice: Subject to any disclaimer, the term of this patent is extended or adjusted under 35 U.S.C. 154(b) by 0 days.

(21) Appl. No.: 15/853,977

(22) Filed: Dec. 26, 2017

(65) Prior Publication Data

US 2018/0195629 A1    Jul. 12, 2018

(30) Foreign Application Priority Data

Jan. 11, 2017 (TW) .............................. 106100787 A
Nov. 2, 2017 (TW) .............................. 106216237 U

(51) Int. Cl.
*F16K 17/18* (2006.01)
*F16K 17/22* (2006.01)
*G05D 16/06* (2006.01)

(52) U.S. Cl.
CPC .............. *F16K 17/22* (2013.01); *F16K 17/18* (2013.01); *G05D 16/0636* (2013.01); *G05D 16/0661* (2013.01); *G05D 16/0669* (2013.01); *Y10T 137/7796* (2015.04)

(58) Field of Classification Search
CPC ..... F16K 17/18; F16K 17/22; G05D 16/0636; G05D 16/0652; G05D 16/0661; G05D 16/0669; G05D 16/0672; Y10T 137/7796

USPC ...................................................... 137/505.13
See application file for complete search history.

(56) References Cited

U.S. PATENT DOCUMENTS

| | | | | |
|---|---|---|---|---|
| 2,806,481 A * | 9/1957 | Faust | ................... | G05D 16/163 137/116.5 |
| 2,940,462 A * | 6/1960 | Johanson | ........... | G05D 16/0672 137/116.3 |
| 3,926,204 A * | 12/1975 | Earl | ....................... | G05D 16/02 137/116.5 |
| 4,108,197 A * | 8/1978 | Brakebill | ........... | G05D 16/0672 137/81.1 |
| 4,185,772 A * | 1/1980 | Brakebill | ........... | G05D 16/0672 137/115.03 |

(Continued)

*Primary Examiner* — William M McCalister
(74) *Attorney, Agent, or Firm* — Leong C. Lei

(57) ABSTRACT

An improved structure of an energy-saving precision pressure adjusting valve includes a main body in an interior of which a main membrane and a balance membrane are arranged. The main membrane is operable by an overflow tube and the balance membrane is operable by a pressure-adjusting stein, so that when pneumatic fluid enters the main body, through a channel, a feedback channel and a pressure regulation channel that communicate with each other, together with a feedback channel flow regulation hole and a steel ball arranged in the feedback channel, the pneumatic fluid is allowed to flow in one direction, in combination with stein covering rubber provided on the pressure-adjusting stein and membrane covering rubber provided on the main membrane, the flowing of the pneumatic fluid is made faster and the purpose of fast increase and decrease of pressure and high precision pressure output can be achieved.

10 Claims, 17 Drawing Sheets

(56) References Cited

U.S. PATENT DOCUMENTS

| | | | | |
|---|---|---|---|---|
| 4,774,923 A * | 10/1988 | Hayashi | ............... | F02M 69/54 |
| | | | | 123/381 |
| 5,469,877 A * | 11/1995 | Askew | ............... | G05D 16/0663 |
| | | | | 137/85 |
| 5,586,575 A * | 12/1996 | Bergamini | ......... | F15B 13/0438 |
| | | | | 137/488 |
| 5,595,209 A * | 1/1997 | Atkinson | .......... | G05D 16/0672 |
| | | | | 137/116.5 |
| 5,785,080 A * | 7/1998 | Herbst | ................ | F02M 69/54 |
| | | | | 123/463 |
| 6,019,121 A * | 2/2000 | Uehara | ............ | G05D 16/0672 |
| | | | | 137/116.5 |
| 6,554,017 B2 * | 4/2003 | Berger | ............. | G05D 16/0663 |
| | | | | 137/115.13 |
| 7,192,665 B2 * | 3/2007 | Nakajima | ........... | F16K 17/196 |
| | | | | 123/463 |
| 8,104,740 B2 * | 1/2012 | Igarashi | ............. | F16K 31/1268 |
| | | | | 251/331 |
| 8,342,201 B2 * | 1/2013 | Nitta | ................ | G05D 16/0669 |
| | | | | 137/505.11 |
| 2013/0074956 A1 * | 3/2013 | Okitsu | .............. | G05D 16/163 |
| | | | | 137/505 |
| 2014/0174563 A1 * | 6/2014 | Yamauchi | ......... | G05D 16/0661 |
| | | | | 137/489.5 |

\* cited by examiner

STRUCTURE OF ENERGY-SAVING PRECISION PRESSURE ADJUSTING VALVE

BACKGROUND OF THE INVENTION (a) Technical Field of the Invention

The present invention generally relates to an improved structure of an energy-saving pressure adjusting valve, and more particularly to a structure that allows for flow regulation of a pneumatic fluid by means of a unidirectional flow through a feedback channel to achieve a balance condition between the feed channel and a pressure regulation channel, which, when used in combination with an overflow tube and an overflow opening, allows for applications in energy-saving large-capacity precision pressure adjusting valves and also helps achieve the purposes of efficient increase and decrease of pressure and supply of high precision output of pressure.

(b) Description of the Prior Art

Conventional pressure adjusting valves usually would lose some pneumatic fluid in adjustment of pressure. Valve manufacturers direct their effort to techniques that help reduce energy lose in processes of fabrication in order to meet future demand of automatized and more precise manufacturing. Taiwan Utility Model M513296, which is owned by the present inventor, discloses a precision pressure regulating valve, in which a channel is provided in an interior of a structure to generate pressures that are equivalent and can be fed back to each other so as to greatly reduce loss of energy and also to keep relatively quite in draining excess fluid.

The present inventor has also made additional improvements on such a structure disclosed in the utility Model. An example is Taiwan Patent No. 1591280, which discloses an energy-saving precision pressure adjusting valve, in which a balance membrane and a main membrane are respectively arranged at two ends of a pressure-adjusting stein inside a structure, so that through pressures flow into corresponding channels, the pressure-adjusting stein may push against the balance membrane so that internal pressure would not generate an overflow to allow for subsequent operation of adjustment, while providing output pressure at high precision.

In addition, Taiwan Patent No. 1576526 discloses an energy-saving large-capacity precision pressure adjusting valve, in which a pressure-adjusting stein and a direct-operation flow control stein arranged in an interior of a structure, which when used in combination input pressure, help ensure an operation in which a vertical movement is kept smooth during movements of balance membrane and main membrane as being acted upon by pressure so as to achieve the purpose of regulating pressure with a high precision under a condition of no pressure overflow occurring in the main body. However, after actual fabrication and use, it is found that the direct-operation flow control stein suffers the problem that to balance pressure difference between an input balance pressure and a secondary side pressure, the direct-operation flow control stein, although allowing for release of pressure inside the main body through the main membrane and an overflow tube, requires an aperture in a center of the main membrane and an overflow opening to be opened simultaneously in order to proceed with the adjustment. Such an operation is deficient in respect of insufficiency of flexibility in case that the pressure difference is not large, and in addition, the number of parts that make up the main membrane is large, making it necessary to provide more pressure output in achieving balance between the internal balance pressure and the secondary side pressure.

SUMMARY OF THE INVENTION

The present invention relates to an improved structure of energy-saving precision pressure adjusting valve of which the primary technical objective is to provide multiple channels in an interior of a main body, in which operative coordination between a feedback channel and a steel ball allows a pneumatic fluid thereof to carry out regulation of low so that the channels in the interior of the main body may be maintained in a balance condition, which, together with a combination of an overflow tube and an overflow hole, allows the present invention to achieve the purposes of fast pressure adjustment.

The aforesaid structure is generally made up of a pressure adjusting assembly, an intermediate valve assembly, and a base that are joined together. A main membrane and a balance membrane are arranged in the interior of a main body such that with a pneumatic fluid flowing through a channel, a feedback channel, and a pressure regulation channel, a steel ball and a feedback channel flow regulation hole configured in the feedback channel are used to have the pneumatic fluid balanced in the main body, allowing the balance membrane and the main membrane to undergo vertical movements respectively corresponding to a pressure-adjusting stein and an overflow tube, respectively. With the linked operation among the above structures, in adjusting the level of pressure, in addition to being of no overflow and energy saving, it is also possible to achieve the purposes of fast increase and decrease of pressure and maintaining high precision of pressure output, and is also possible to keep the function of precision adjustment of pressure even in application to large-capacity pressure adjusting valves.

In the application to large-capacity precision pressure adjusting valve, structurally, a pressure adjusting assembly, an intermediate valve assembly, a main valve assembly, and a base are joined together to collectively form a main body. The main body is provided therein with a main membrane and a balance membrane, such that with a pneumatic fluid flowing through a channel, a balance pressure channel, a base channel, and a pressure regulation channel that are configured inside the main body, a feedback channel is used to achieve the purposes of fast balance of the pneumatic fluid in the balance pressure channel and the base channel in a manner of flowing in one direction. The main membrane may press against the overflow tube so that the main membrane may drive the overflow tube to do reciprocal axial movement to allow the main body to conduct continuous adjustment of pressure for increasing and decreasing in a condition of no pressure overflow, and the feedback channel arranged in the intermediate valve assembly may achieve the purposes of fast adjusting a secondary side pressure of high precision by allowing the pneumatic fluid to fast flow through the feedback channel The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction

DETAILED DESCRIPTION OF THE PREFERRED EMBODIMENTS

Figure 1:
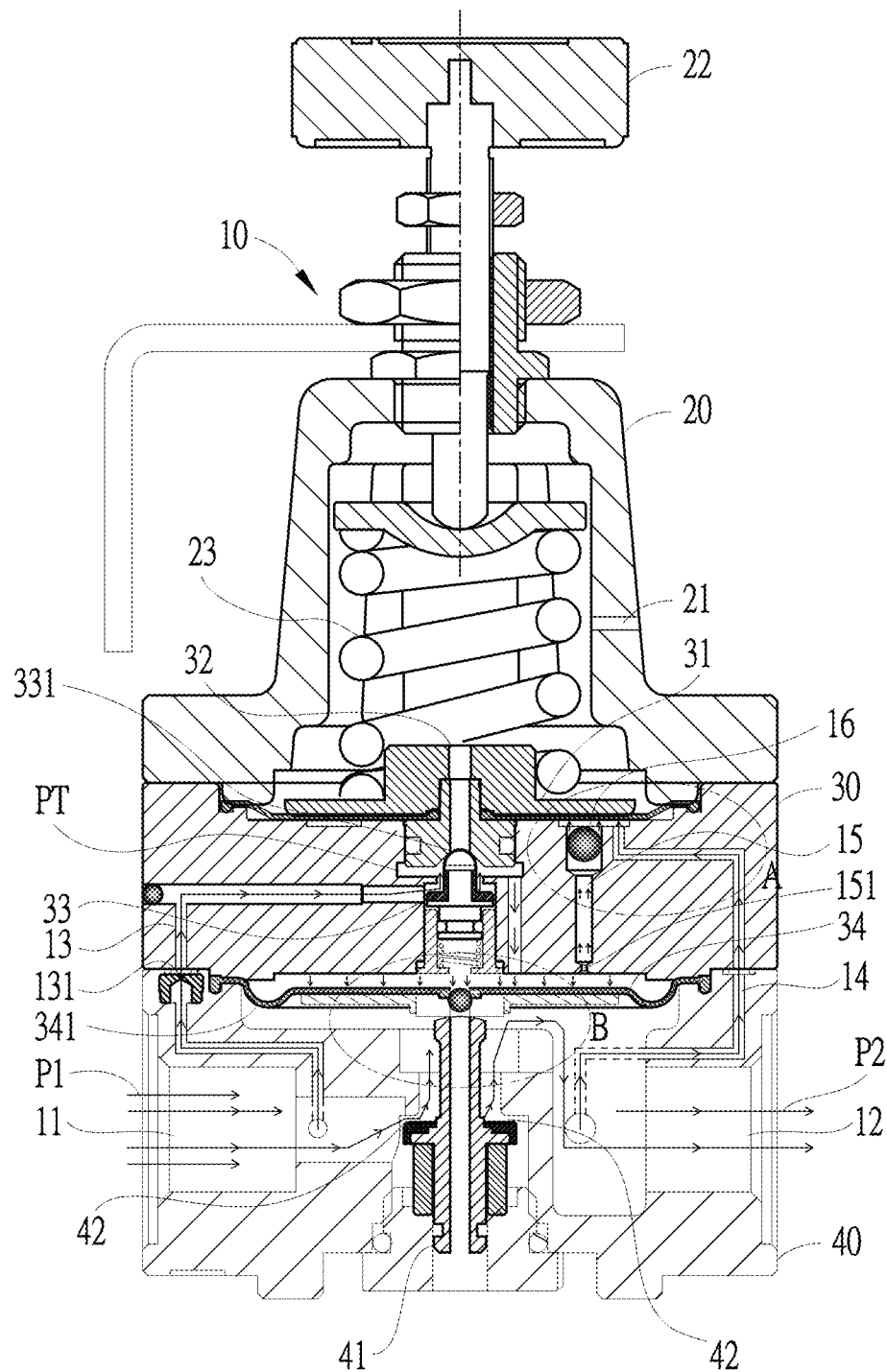
FIG. 1 is a cross-sectional view illustrating a structure of a preferred embodiment of the present invention in closing fast discharge.
Figure 2:
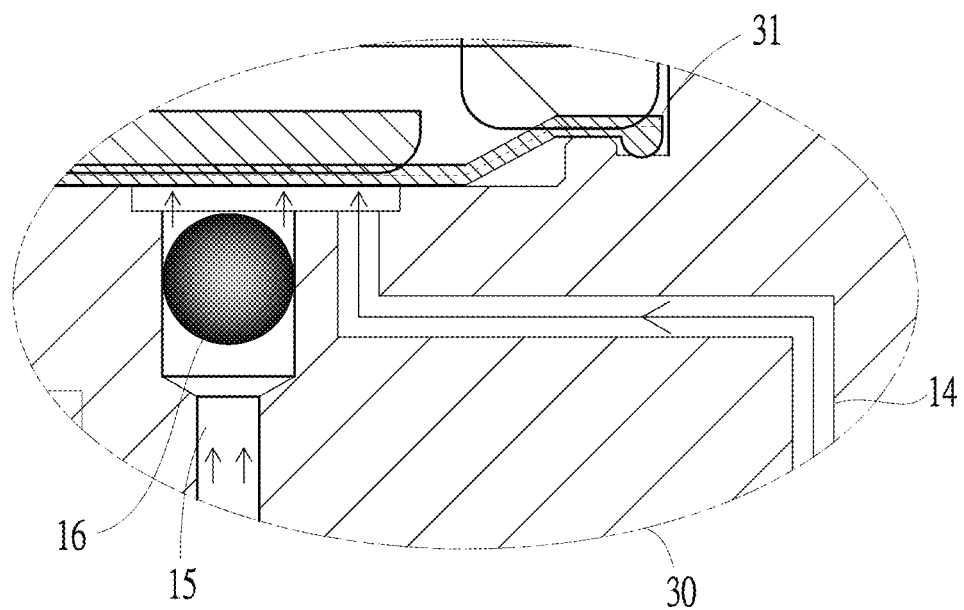
FIG. 2 is a schematic view showing, in an enlarged form, a portion of the cross-sectional structure of the preferred embodiment of the present invention shown in FIG. 1, indicated by "A".
Figure 3:
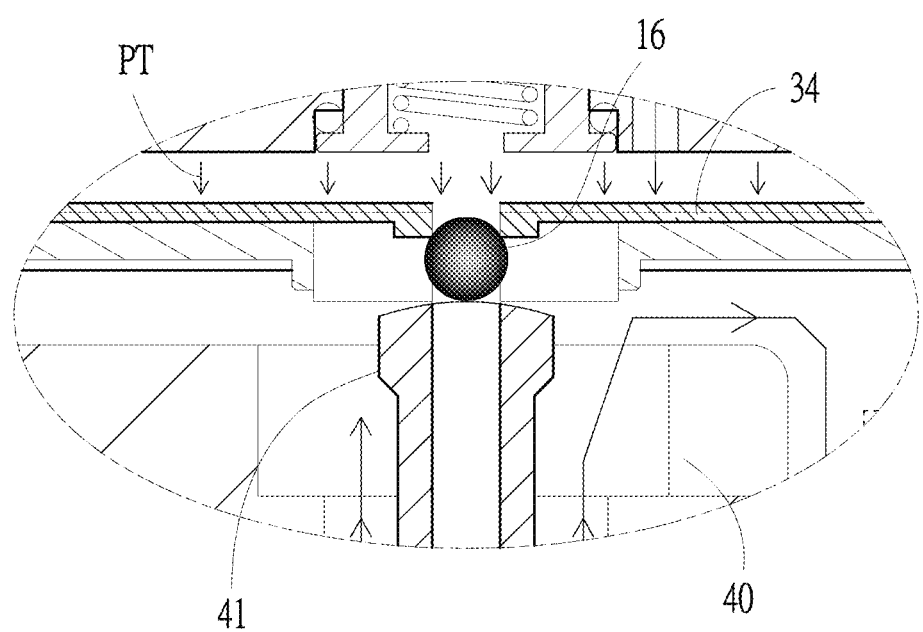
FIG. 3 is a schematic view showing, in an enlarged form, a portion of the cross-sectional structure of the preferred embodiment of the present invention shown in FIG. 1, indicated by "B".
Figure 4:
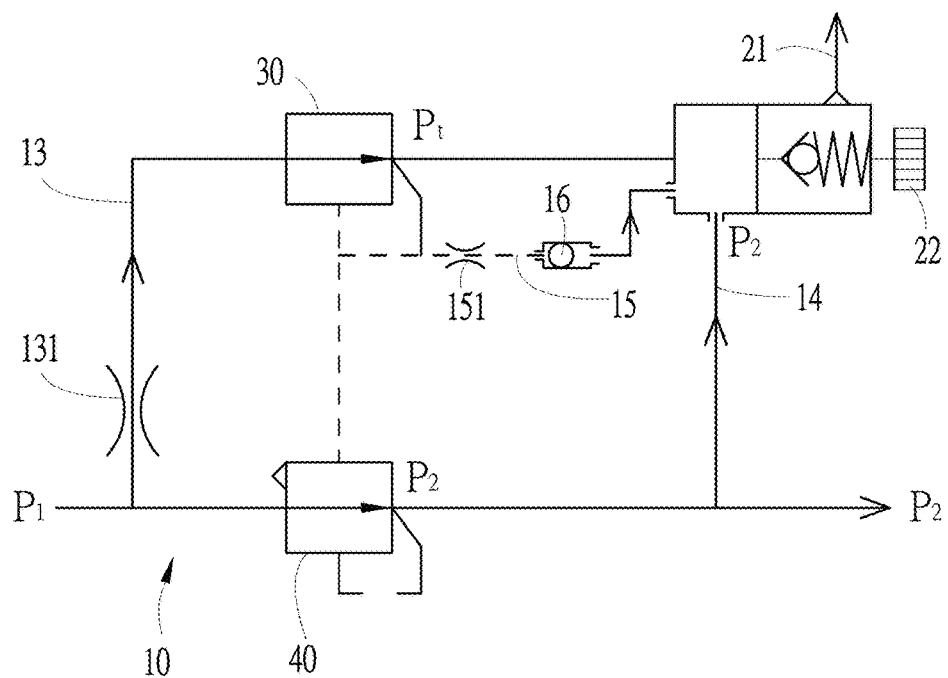
FIG. 4 is a schematic view showing the preferred embodiment of the present invention.

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention relates to an improved structure of an energy-saving precision pressure adjusting valve, which includes a main body (10), which is provided with an inlet (11) and an outlet (12) respectively for entry and exit of a pneumatic fluid (P). The pneumatic fluid (P) provides a balance pressure, a primary side pressure (P1), and a secondary side pressure (P2). The main body (10) includes a pressure adjusting assembly (20), an intermediate valve assembly (30), and a base (40) that are connected sequentially from top to bottom. A balance membrane (31) is arranged between the pressure adjusting assembly (20) and the intermediate valve assembly (30), and a main membrane (34) is arranged between the base and the intermediate valve assembly (30). The main membrane (34) is covered with membrane covering rubber (341).

The intermediate valve assembly (30) is provided, in an interior thereof, with a channel (13), a pressure regulation channel (14), a feedback channel (15), and a pressure-adjusting stein (33). The pressure-adjusting stein (33) is covered with stein covering rubber (331). The channel (13) extends from the base (40), starting at the inlet (11), to a site where the pressure-adjusting stein (33) is located. The channel (13) is provided with a channel flow regulation hole (131). Pneumatic fluid (P), when entering through the inlet (11), forms a primary side pressure (P1) that reaches the pressure-adjusting stein (33) through the channel (13), such that surplus primary side pressure (P1) is reduced by means of the channel flow regulation hole (131). Through an operation of the pressure adjusting assembly (20) in combination with a rotary knob (22) to make adjustment for increasing pressure, a main spring (23) is driven downward to push against the balance membrane (31) and the pressure-adjusting stein (33) so that the pressure-adjusting stein (33) is manipulated to allow the primary side pressure (P1) to flow to the main membrane (34), thereby forming the balance pressure (PT).

The feedback channel (15) is arranged in an interior of the intermediate valve assembly (30) and is adjacent to and at one side of the channel (13). When the balance pressure (PT) is guided to the main membrane (34), the main membrane (34) and an overflow tube (41) are pushed to move downward together, thereby opening a valve opening (42) of the overflow tube (41) so that the primary side pressure (P1) that is present in the inlet (11) flows through the valve opening (42) to the outlet (12), thereby forming the secondary side pressure (P2).

The pressure regulation channel (14) extends from the outlet (12) of the base (40) to a site in communication with the balance membrane (31). A portion of the secondary side pressure (P2) moves toward the balance membrane (31) through the pressure regulation channel (14). When the secondary side pressure (P2) is less than the balance pressure (PT), a portion of the balance pressure (PT) in the main membrane (34) pushes a steel ball (16) as flowing through a feedback channel flow regulation hole (151) and the feedback channel (15) to then joins with the secondary side pressure (P2), thereby balancing the secondary side pressure (P2) in the pressure regulation channel (14).

Figure 6:
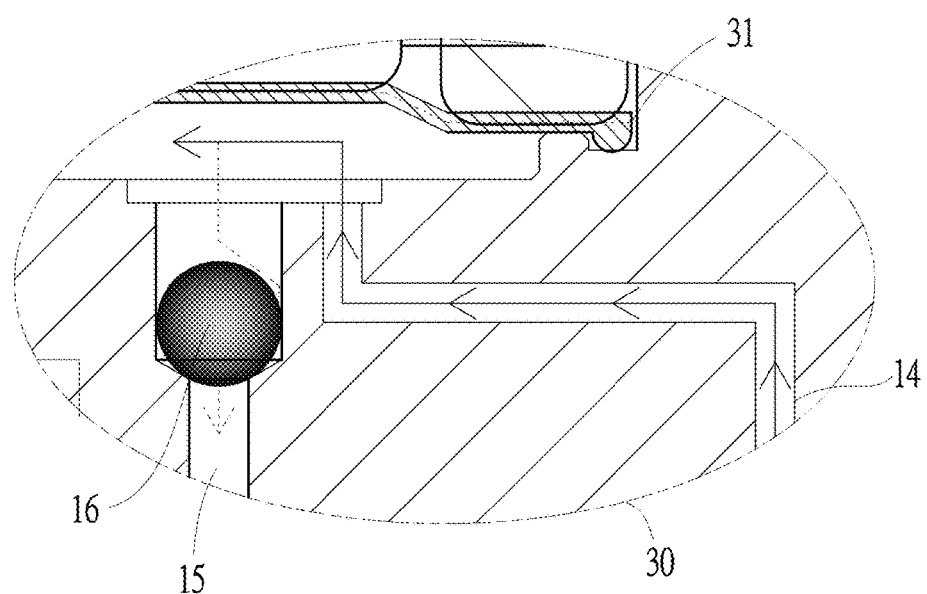
FIG. 6 is a schematic view showing, in an enlarged form, a portion of the cross-sectional structure of the preferred embodiment of the present invention shown in FIG. 5, indicated by "A1".
Figure 7:
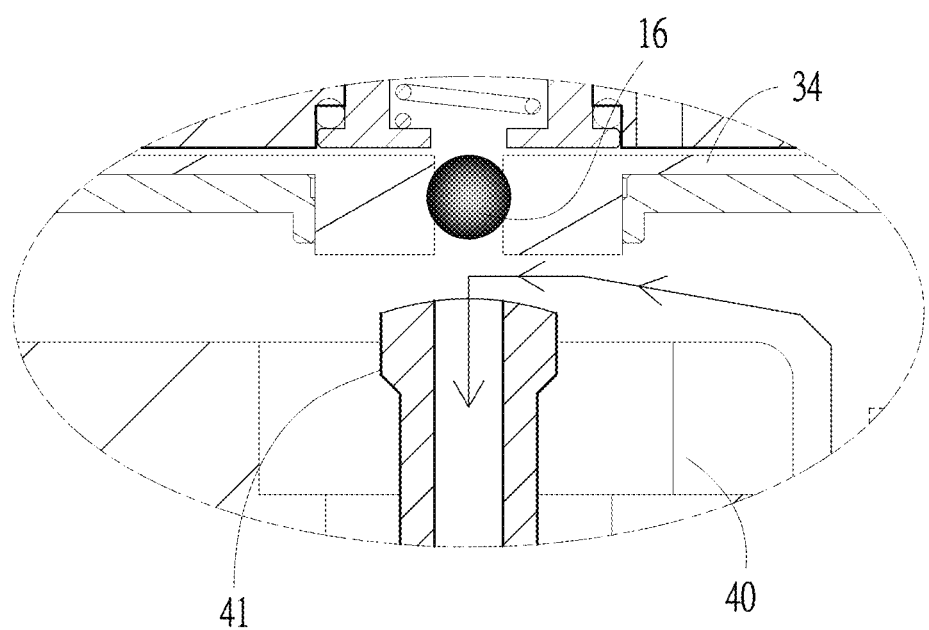
FIG. 7 is a schematic view showing, in an enlarged form, a portion of the cross-sectional structure of the preferred embodiment of the present invention shown in FIG. 5, indicated by "B1".

As shown in FIG. 6, the feedback channel (15) has an upper portion that is made in a circular hole configuration on the side corresponding to the secondary side pressure (P2) and is also made in a circular conic hole configuration beneath the steel ball (16) on the side corresponding to the balance pressure (PT), so that when the secondary side pressure (P2) is greater than the balance pressure (PT), the secondary side pressure (P2) pushes the steel ball (16) against the circular conic hole to allow only a very small portion of the secondary side pressure (P2) to flow into the balance pressure (PT) to be discharged, through a central holed section of a piston (32), to the overflow hole (21) of the pressure adjusting assembly (20) for subsequent discharging to the outside of the main body (10). A major portion of the secondary side pressure (P2) pushes away the main membrane (34) to allow surplus pressure to directly pass through the overflowing tube (41) to be discharged out of the main body (10) through the base (40) for fast pressure reduction of the interior of the main body (10), and consequently, the balance pressure (PT) can be kept greater than the secondary side pressure (P2) to allow for quick stabilization of the pressure of the main body (10). When an annular area between the steel ball (16) and the feedback channel (15) is reduced to the smallest, the flow of the pneumatic fluid (P) would be reduced to the minimum as well and when the secondary side pressure of the feedback channel (15) is lowered, it is possible to ensure that the secondary side pressure (P2) may still push the steel ball (16) to abut the circular conic hole on the balance pressure (PT) side to achieve the same effect. For the entirety at this point, since the pneumatic fluid (P) flows within each of the channels and balance may be achieved, pressure regulation of the main body (10) may maintain high precision e of pressure output.

After pressure setting is accomplished on the main body (10), the increase or decrease of the balance pressure (PT) would affect an axial movement of the main membrane (34) and cause a dynamic response of abrupt pressure increase in a very short period for the secondary side pressure (P2). As described in the previous paragraphs, the pneumatic fluid (P) flows among each of the channels to achieve balance, so that the short-period dynamic response of pressure increase would be quickly stabilized. Each time the outlet (12) is opened and stops output pressure, the secondary side pressure (P2) would also undergoes a dynamic response of abrupt pressure increase in a very short period of time. This condition is similar to the pressure setting scenario; however due to the response caused after assembly of components cannot be made identical for each time, the secondary side pressure (P2) may maintain within a smaller range with respect to the set pressure, this being the precision of the main body (10) for repeating pressure. According to the present applicant's repeated tests and practice, the error range is within ±0.5% of the largest set pressure and the same, predetermined performance can be kept even for application to large-capacity, energy-saving, precise pressure adjustment.

Figure 5:
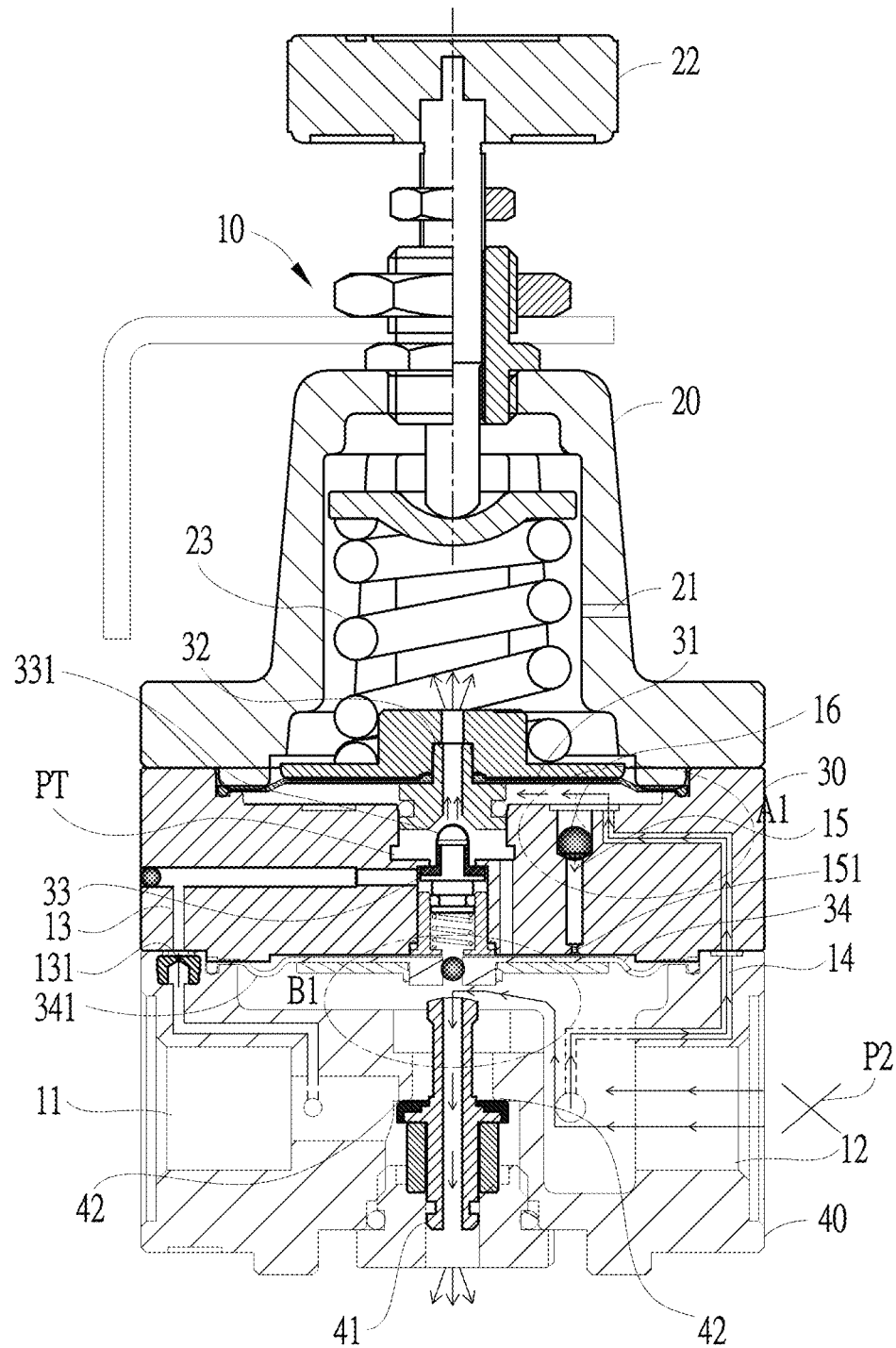
FIG. 5 is a cross-sectional view illustrating the structure of the preferred embodiment of the present invention in opening fast discharge.

When the main body (10) is operated for pressure reduction, the rotary knob (22) is turned to reduce the amount of compression of the main spring (23) to thereby reduce the force of the main spring (23) so that the balance membrane (31) is pushed by the secondary side pressure (P2) and the balance pressure (PT) and the central holed section of the piston (32) is opened. The balance pressure (PT) is therefore discharged to the overflow hole (21) of the pressure adjusting assembly (20) and then discharged out of the main body (10) through the channel of a piston (32) to achieve fast discharge and pressure reduction. At the moment, the pressure-adjusting stein (33) is driven by a spring at a bottom thereof to close the valve opening and also close the channel (13). The main membrane (34), being affected by the reduction of the balance pressure (PT), returns to the original position. At the moment, the valve opening (41) is in a closed condition, as shown in FIG. 5. Under the condition that (P2)*(area of the main membrane (34))>balance pressure (PT)*(the area of the main membrane (34)), the secondary side pressure (P2) may push open the main membrane (34) to directly pass through the overflow tube (41) for quickly discharging out of the main body (10) from the base (40). As described in the previous paragraphs, a very small portion of the secondary side pressure (P2) joint the balance pressure (PT) by way of the pressure regulation channel (14), the feedback channel (15), and the steel ball (16), and then flows, through the central holed section of the piston (32) in the middle of the balance membrane (31), to the overflow hole (21) of the pressure adjusting assembly (20) for discharging out of the main body (10). As such, the main body (10) is allowed to carry out discharging at two sites to reduce the balance pressure (PT) and the secondary side pressure (P2) at the same time, making the efficiency thereof faster, and achieving the same predetermined effect for applications to large-capacity, energy-saving, precise pressure adjustment valves.

Figure 8:
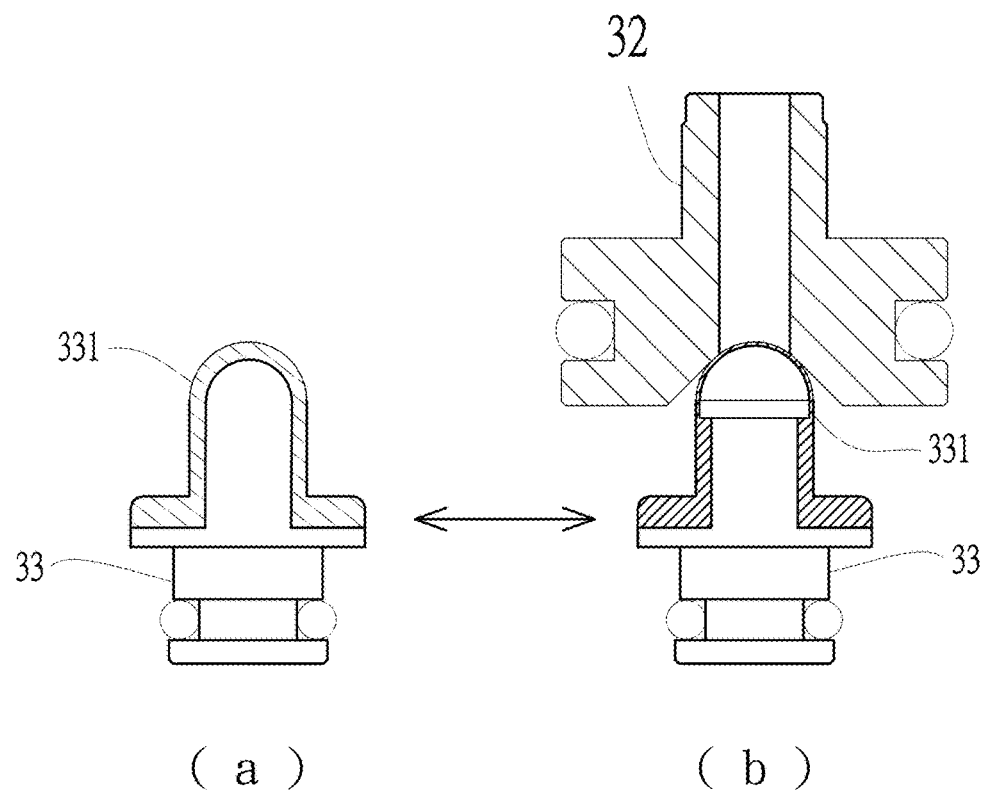
FIG. 8 is a schematic view showing stem covering rubber of a pressure-adjusting stem of the preferred embodiment of the present invention.

Referring to FIG. 8, which is a schematic view showing the pressure-adjusting stein (33), it can be seen that the pressure-adjusting stein (33) is covered on an outside surface thereof with the stein covering rubber (331), wherein in the left-hand side part (a), the stein covering rubber (331) is thicker, while in the right-hand side part, the stein covering rubber (331) is thinner, the thickness being increased or decreased for designs made according to various conditions, including the capacity of pressure adjusting valve and the level of precision of output pressure output. The thickness mainly affects the amount of compression between the piston (32) in the middle of the balance membrane (31) and the stein covering rubber (331) and the smaller the thickness, the less the amount of compression would be and the easier it would be for opening the central holed section of the piston (32) to increase the speed of discharge of the balance pressure (PT) and reduce delay of the reduction of the balance pressure (PT). When the space occupied by the balance pressure (PT) is reduced to the least, the delay is also be reduced to the minimum. Therefore, increase and decrease of the balance pressure (PT) may be achieved quickly to allow pressure regulation of the main body (10) to maintain high precision of pressure output and the same, predetermined performance can be kept even for application to large-capacity, energy-saving, precise pressure adjusting valve.

Figure 9:
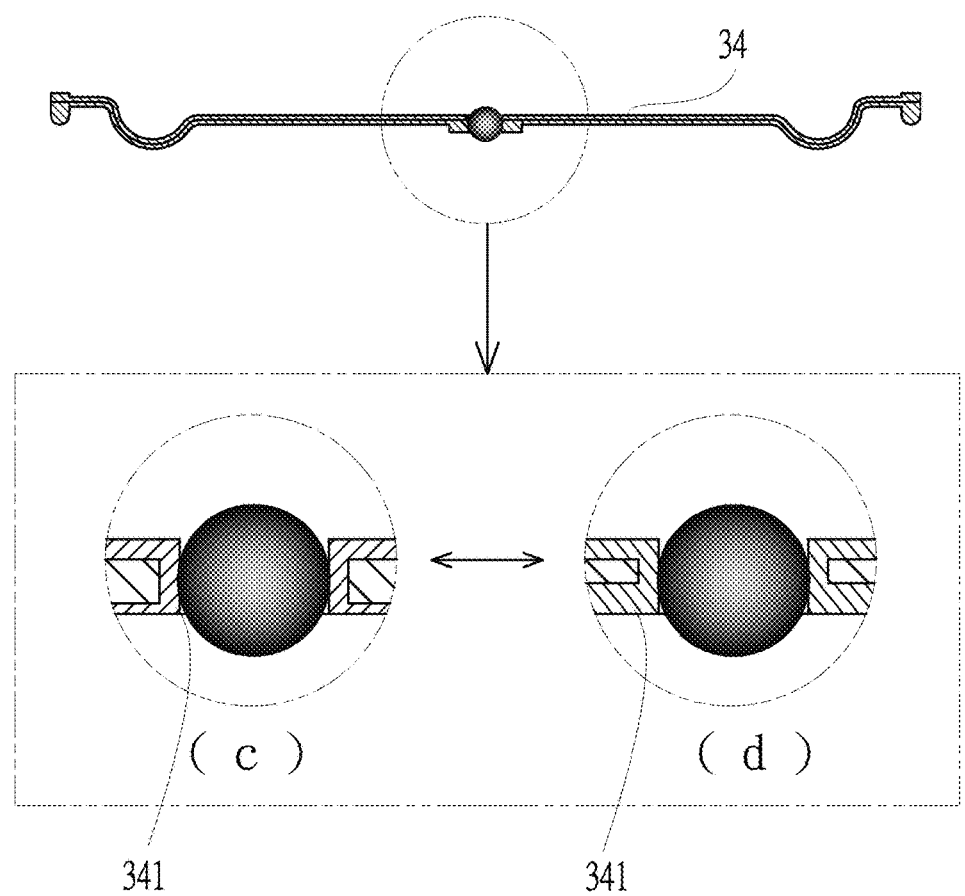
FIG. 9 is a schematic view showing membrane covering rubber of a main membrane of the preferred embodiment of the present invention.

Referring to FIG. 9, the thickness of the membrane covering rubber (341) provided on a surface of the main membrane (34) may affect the amount of compression of the overflow tube (41). In this drawing, the thickness of the membrane covering rubber (341) in the left-hand side part (c) is smaller, while that in the right-hand side part (d) is large. The smaller the thickness is, the less the amount of compression would be so as to increase the speed of discharge of the secondary side pressure (P2) and reducing delay of the reduction of the secondary side pressure (P2), allowing the pressure regulation of the main body (10) to keep high precision of pressure output and the same, predetermined performance can be kept even for application to large-capacity, energy-saving, precise pressure adjustment. To this point, the speed of the entire structure in discharging the pneumatic fluid (P) is realized. The stein covering rubber (331) and the membrane covering rubber (341) may show certain degree of influence and after repeated tests and practice made by the present applicant, in the structure of the present invention, the thickness of the membrane covering rubber (341) is preferably between 0.1 to 0.15 mm and the thickness of the stein covering rubber (331) is preferably between 0.1 to 0.15 mm, but increasing or decreasing may be done for parts including the stein covering rubber (331) to suit the need of actual manufacturing, and not limited to the disclosure. Surfaces of the piston (32) and the overflow tube (41) do not need to be made smooth by polishing during the production thereof, and slightly unsmooth surfaces provide better sensitivity for discharging than smooth surfaces, and may make manufacturing convenient, be good for sealing, and also help improve flowing of the pneumatic fluid (P).

Figure 10:
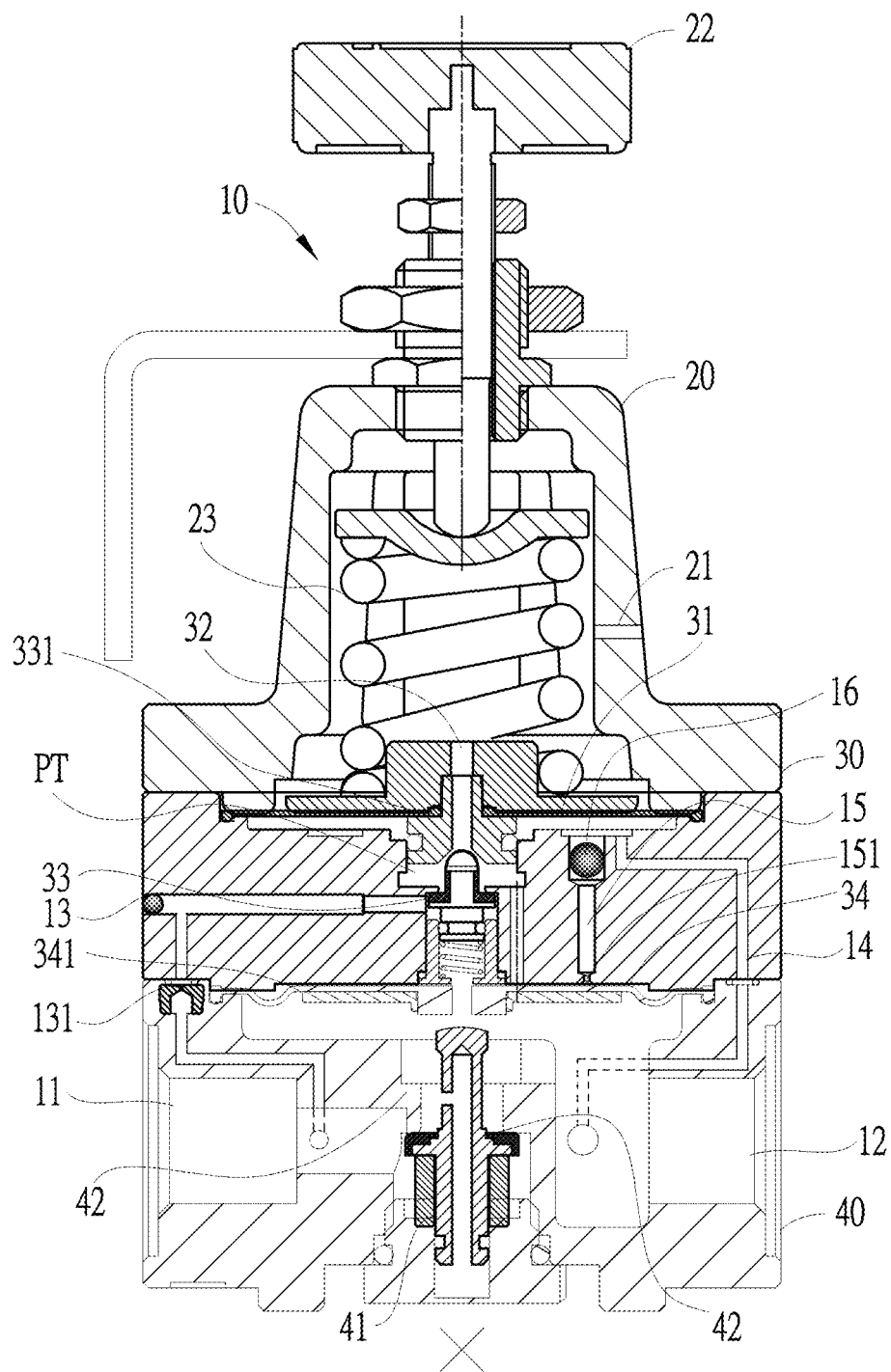
FIG. 10 is a cross-sectional view showing another embodiment of the present invention.

Referring to FIG. 10, another embodiment of the present invention is shown, having a structure and operation principle similar to those of the previous embodiment. A difference is that the main membrane (34) is replaced with a design having a central through opening, and, in addition, holing is made at a location adjacent to the inlet (11) for the overflow tube (41). The secondary side pressure (P2) flows to the bottom of the overflow tube (41) and flows, in discharging gas for pressure reduction, through the central through opening of the main membrane (34) to join the balance pressure (PT) for subsequently flowing with the balance pressure (PT) to the overflow hole (21) for direct discharging, making it suitable for use with a pressure adjusting valve having a smaller flow so that time of discharging is not long and noise of discharging can be effectively reduced.

Further, the previous embodiment, when applied to an energy-saving large-capacity precision e pressure adjusting valve, may have a structure of which a further embodiment is shown in FIGS. 11-17, which includes a main body (10), which is provided with an inlet (11) and an outlet (12) respectively for entry and exit of a pneumatic fluid (P). The pneumatic fluid (P) provides a balance pressure (PT), a primary side pressure (P1), and a secondary side pressure (P2). The main body (10) includes a pressure adjusting assembly (20), a valve assembly (30), a main valve assembly (50), and a base (40) that are connected sequentially from top to bottom. A balance membrane (31) is arranged between the pressure adjusting assembly (20) and the intermediate valve assembly (30). The balance membrane (31) is provided therein with a piston (32) to allow for flow of the pneumatic fluid (P). The intermediate valve assembly (30), is provided, in an interior thereof, with a channel (13), a pressure regulation channel (14), a feedback channel (15), and a pressure-adjusting stem (33) operating in combination with the piston (32). The channel (13), the pressure regulation channel (14), and the feedback channels (15) are allowed to communicate with the base (40) by way of the main valve assembly (50). The main valve assembly (50) is provided therein with a balance pressure channel (52). A main membrane (34) is arranged between the main valve assembly (50) and the base (40). The main membrane (34) is provided with a flow-rate stein (51) to fit therein and mounted thereto. The base (40) is provided therein with a base channel (43), an overflow tube (41), and a valve opening (42) for guiding the pneumatic fluid (P). The pneumatic fluid (P) contained in the pressure regulation channel (14) and the balance pressure channel (52) is such that the pneumatic fluid (P) could be balanced through flowing in one direction in the feedback channel (15) so that the main membrane (34) may drive the overflow tube (41) to do reciprocal axial movement to achieve the purposes of quickly adjusting the secondary side pressure (P2) in a high precision manner without pressure overflow. Here, the overflow tube (41) being driven to do reciprocal axial movement is, in a more specific way, that the main membrane (34), as being balanced with the pneumatic fluid (P), generate multiple position movement in upward and downward direction so that an overflow tube aperture (411) of the overflow tube (41) and the valve opening (42) may be set in opened and closed condition so as to accelerate balancing of the pneumatic fluid (P).

Figure 11:
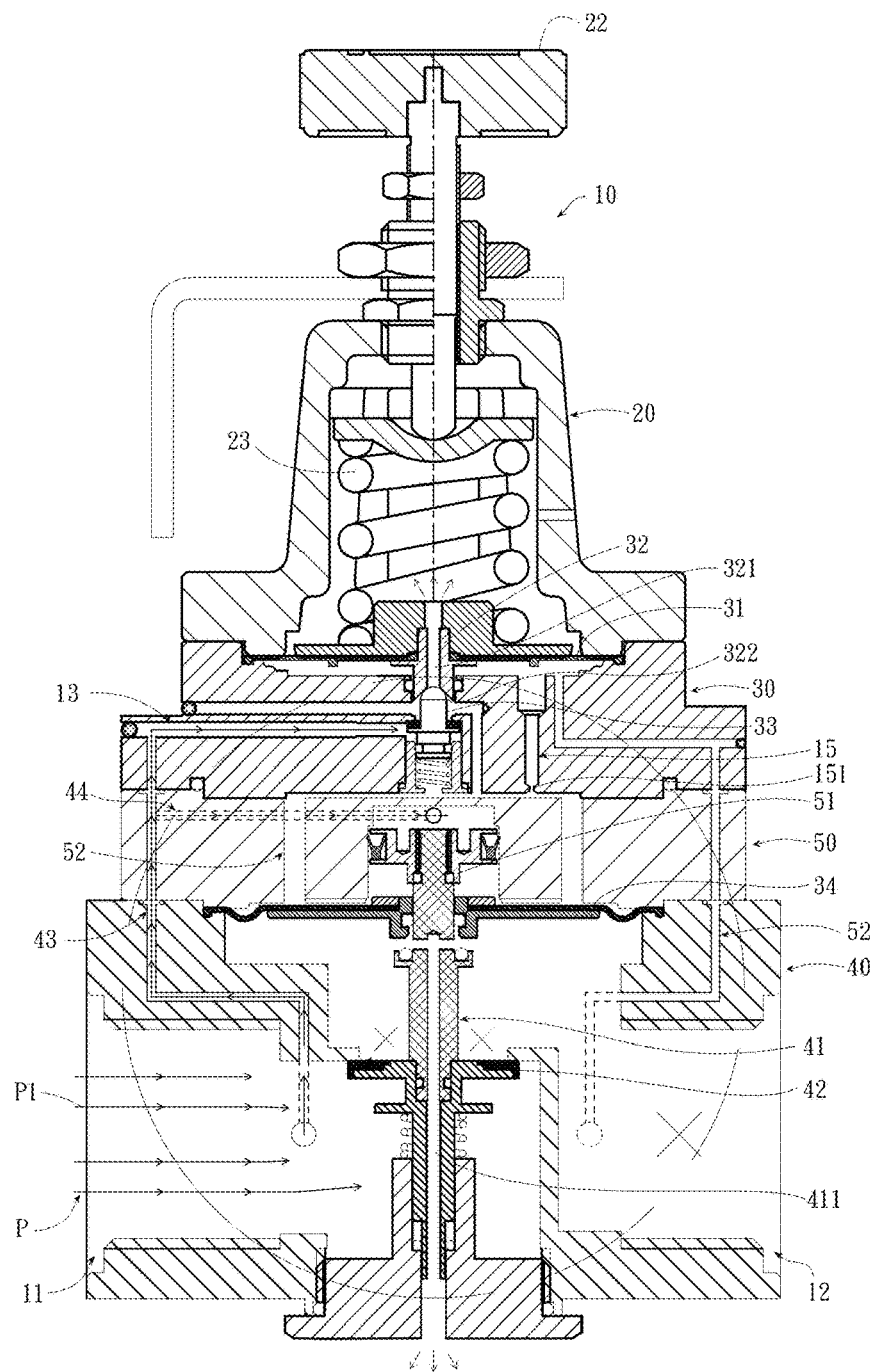
FIG. 11 is a cross-sectional view showing a structure of a further embodiment of the present invention in a condition of not adjusting output of a secondary side pressure.
Figure 12:
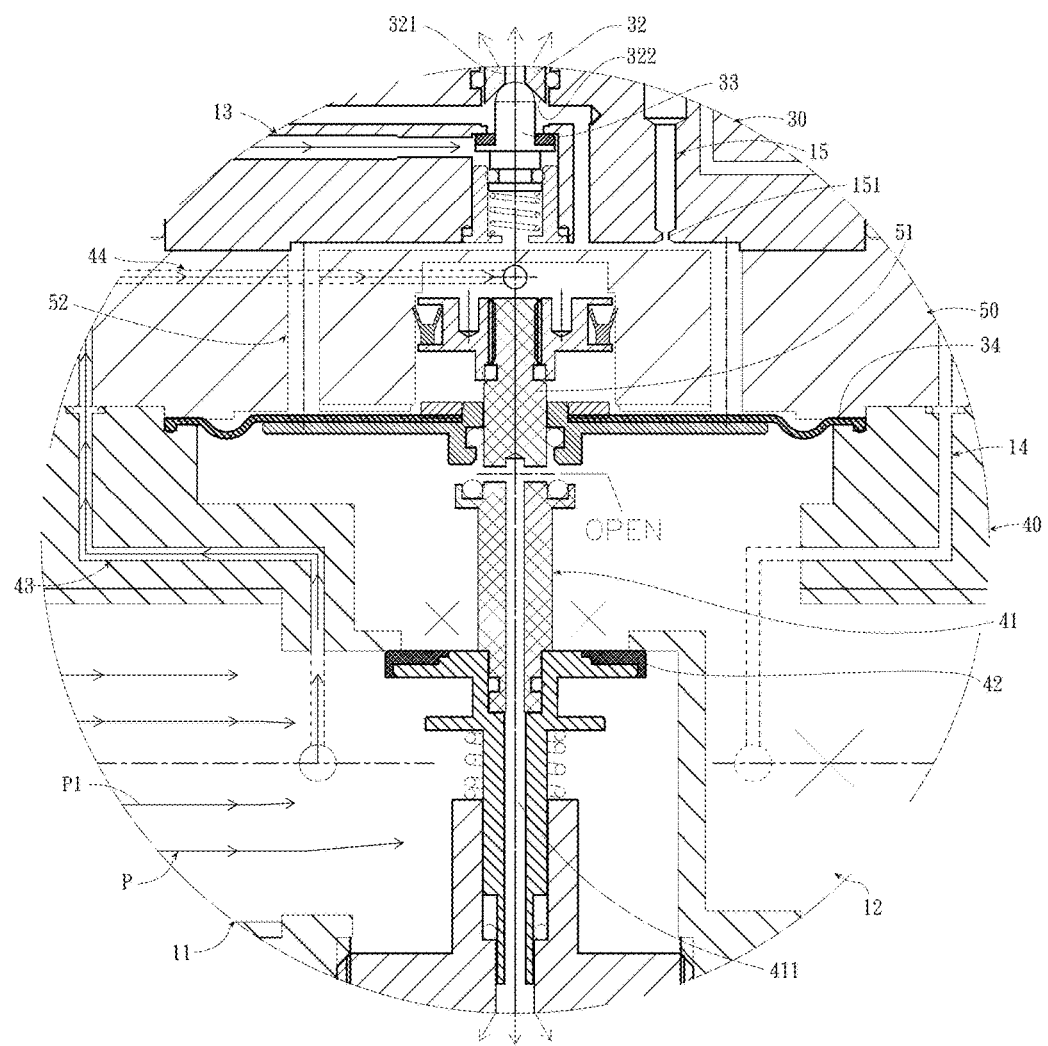
FIG. 12 is a schematic view showing, in an enlarged form, a portion of the cross-sectional structure of said further embodiment of the present invention shown in FIG. 11.
Figure 13:
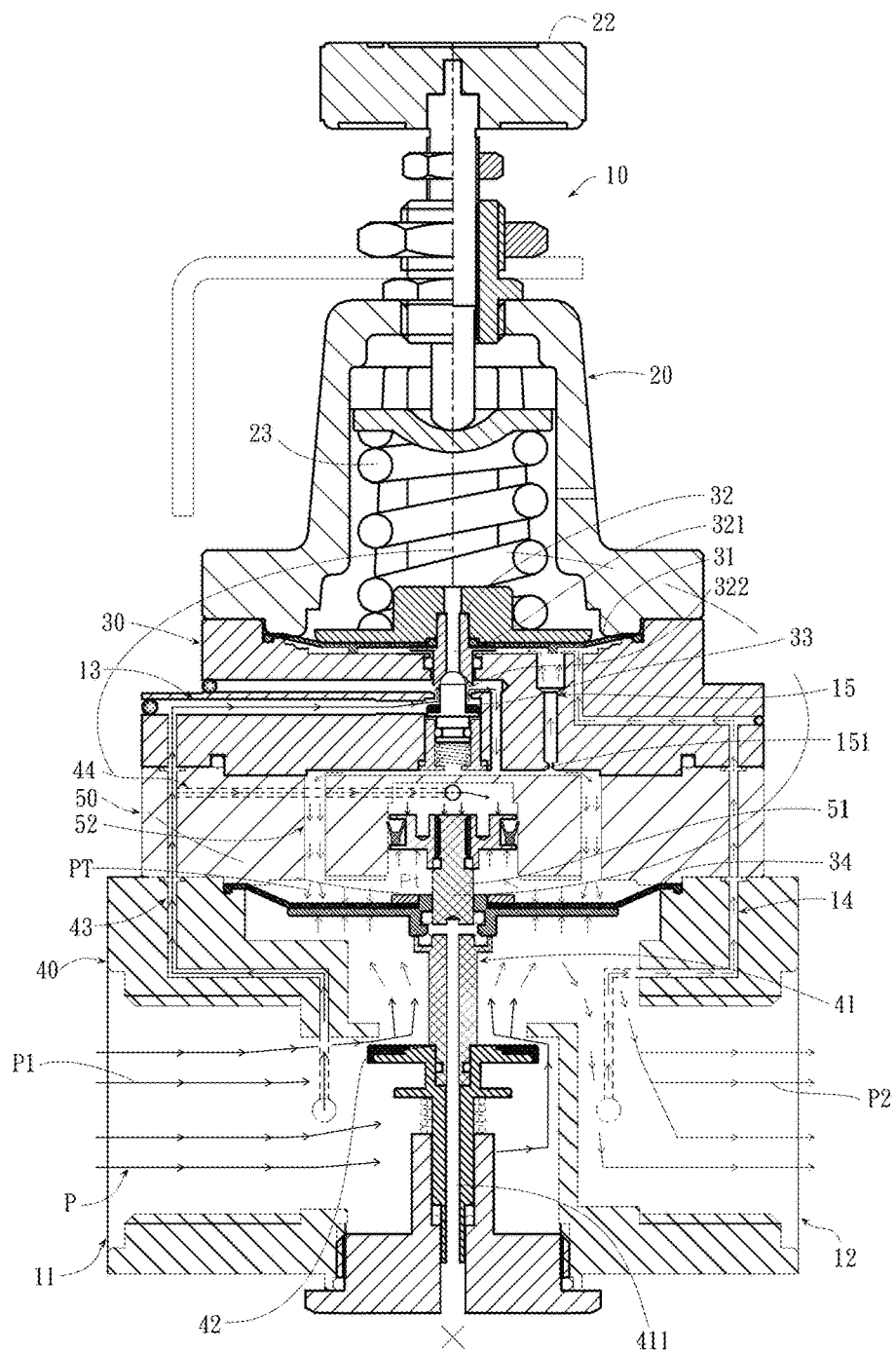
FIG. 13 is a cross-sectional view showing the structure of said further embodiment of the present invention in a condition of adjusting output of the secondary side pressure.
Figure 14:
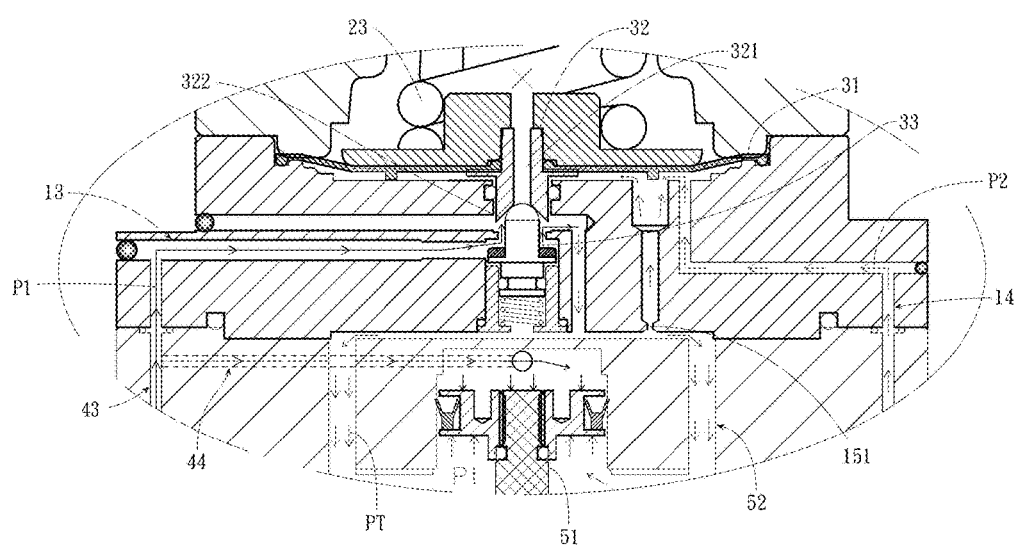
FIG. 14 is a schematic view showing, in an enlarged form, a portion of the cross-sectional structure of said further embodiment of the present invention shown in FIG. 13.
Figure 15:
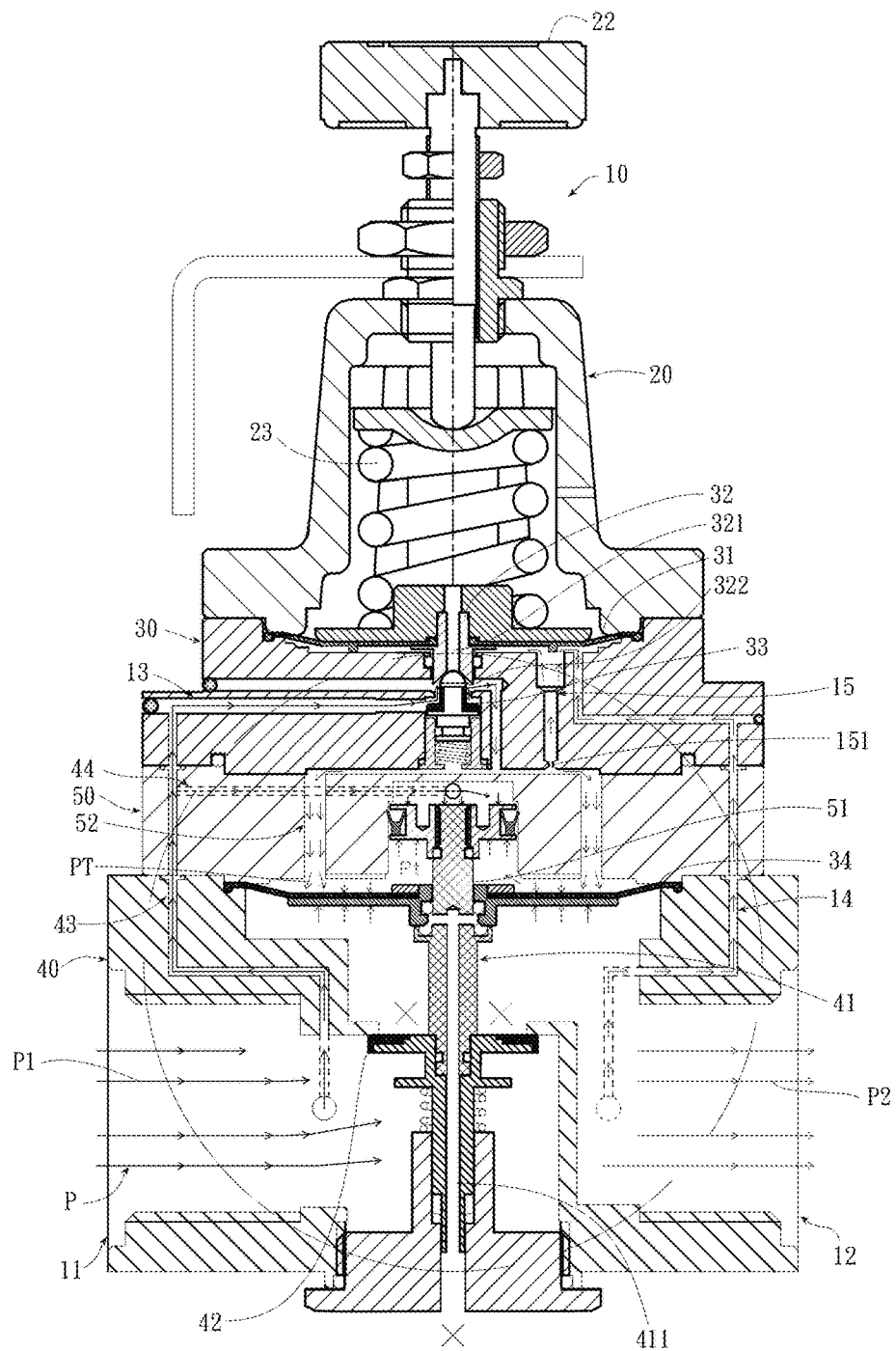
FIG. 15 is a cross-sectional view showing the structure of said further embodiment of the present invention in a standby condition for adjusting output of the secondary side pressure.
Figure 16:
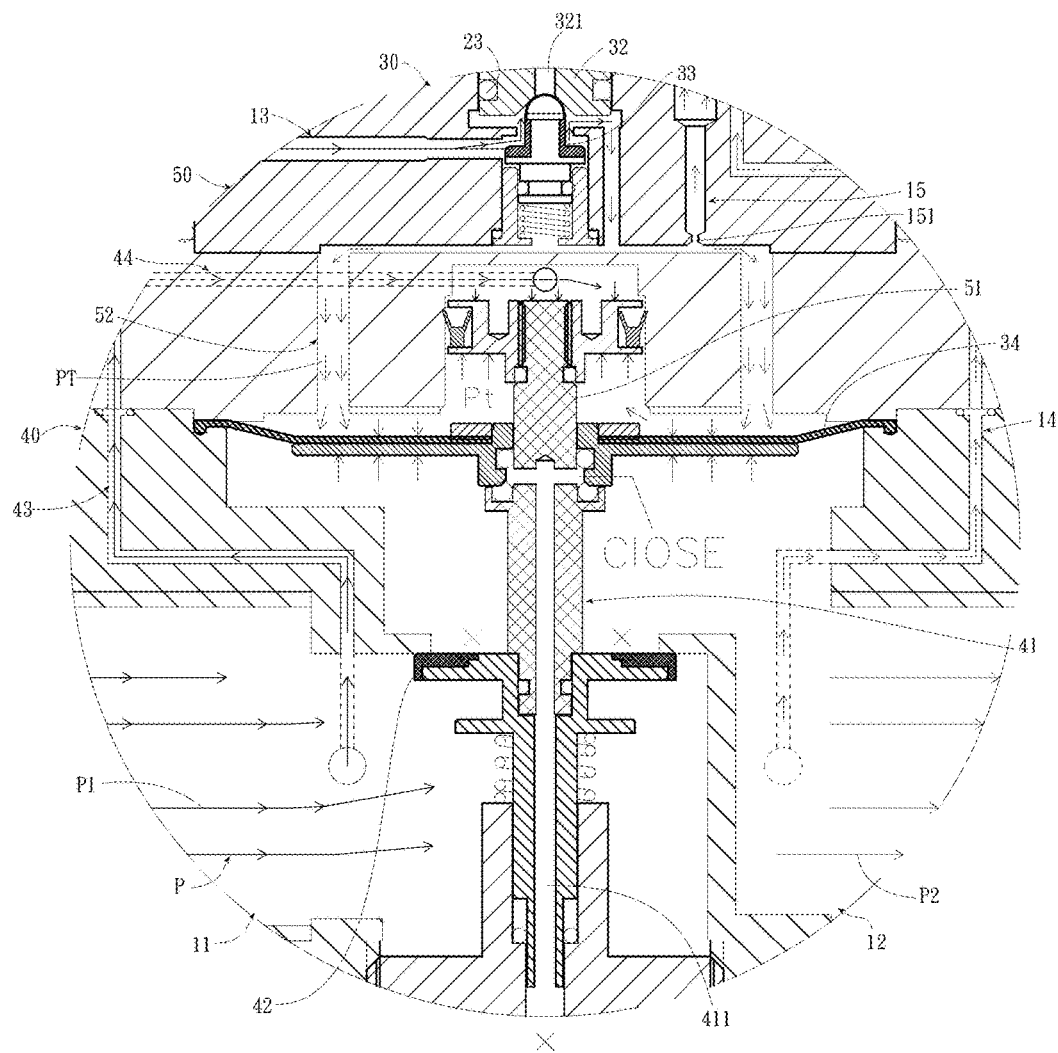
FIG. 16 is a schematic view showing, in an enlarged form, a portion of the cross-sectional structure of said further embodiment of the present invention shown in FIG. 15.
Figure 17:
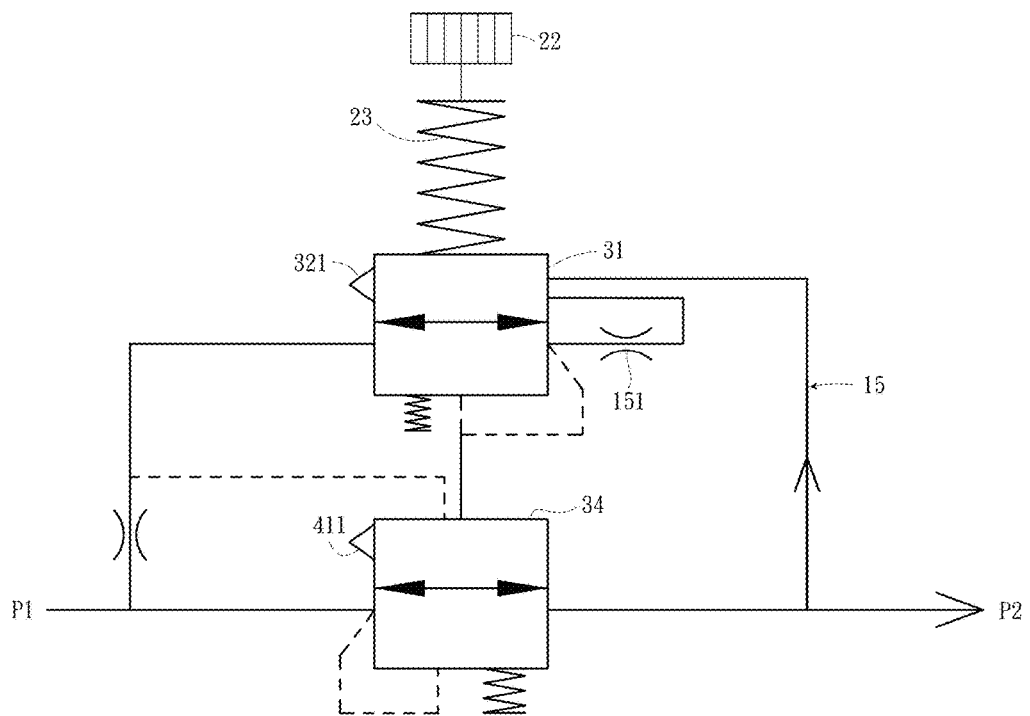
FIG. 17 is a schematic diagram showing a condition of said further embodiment of the present invention.

As shown in FIGS. 11 and 12, a rotary knob (22), which is provided for adjusting pressure, is mounted on the outside of the pressure adjusting assembly (20). To carry out adjustment, the rotary knob (22) causes the main spring (23) that is located inside the pressure adjusting assembly (20) to push against the balance membrane (31). The pneumatic fluid (P) input from the inlet (11) forms the primary side pressure (P1) and the primary side pressure (P1) flows though the base channel (43) and by way of the channel (13) to reach and is thus blocked by the pressure-adjusting stein (33). A throttle hole is configured between the base channel (43) and the channel (13) for adjusting the primary side pressure (P1). The base channel (43) includes, additionally, an auxiliary channel (44) that is arranged in the main valve assembly (50). To this point, it can be seen that the primary side pressure (P1) flows to the sites where the pressure-adjusting stein (33) and the flow-rate stein (51) are located, while the valve opening (42) of the overflow tube (41) that is located in the base (40) is closed whereas the overflow tube aperture (411) of the overflow tube (41) is opened.

As shown in FIGS. 13-17, to adjust the output pressure, the main spring (23) is set to push the balance membrane (31) downward, and at the moment, the piston (32) drives the pressure-adjusting stein (33) to move downward and the primary side pressure (P1) that reaches the pressure-adjusting stein (33) would continues to pass through the balance pressure channel (52) connected thereto to reach the main membrane (34) so that the primary side pressure (P1) becomes the balance pressure (PT).

The balance pressure (PT) pushes the main membrane (34) downward. The flow-rate stein (51) that is fit in and mounted to the main membrane (34) is simultaneously affected by the primary side pressure (P1) in the auxiliary channel (44) and the balance pressure (PT) in the balance pressure channel (52). When the flow-rate stein (51) moves downward to push against the overflow tube (41), the overflow tube aperture (411) is set in a closed condition, while the valve opening (42) is in an open condition. Compared to a prior art structure that is made up of numerous parts, the main membrane (34) described here is made more reliable by adopting clamping in a fixed manner and reducing the number of parts, so that cost expenditure of product can be lowered down. When the valve opening (42) is opened, the primary side pressure (P1) passes through the valve opening (42) to become the secondary side pressure (P2), and the secondary side pressure (P2) is output, by way of the main membrane (34), from the outlet (12), wherein in the course of flow, a portion of the secondary side pressure (P2) passes through the pressure regulation channel (14) to reach the balance membrane (31) for balancing.

When the main body (10) is in a standby condition and the balance pressure (PT) is greater than the secondary side pressure (P2), a portion of the balance pressure (PT) flows through the feedback channel (15) into the pressure regulation channel (14). The feedback channel (15) is provided with a feedback channel flow regulation hole (151) for reducing a pressure difference between the balance pressure (PT) and the secondary side pressure (P2). At the moment, the secondary side pressure (P2) may increase with or without opening the valve opening (42).

As shown in FIGS. 13-17, when the balance pressure (PT) is less than the secondary side pressure (P2), a portion of the secondary side pressure (P2) flows through the pressure regulation channel (14) into the feedback channel (15). With the feedback channel (15) being provided with the feedback channel flow regulation hole (151) for reducing a pressure difference between the balance pressure (PT) and the secondary side pressure (P2), in combination with pressure reduction through a the piston through-aperture (321) provided in the piston (32), the secondary side pressure (P2) may be manipulated without opening main membrane (34) and the overflow tube (41) to smoothly decrease the secondary side pressure (P2). To this point, it can be seen that the consumed amount of the pneumatic fluid (P) in the interior of the main body (10) allows for increase or decrease of the secondary side pressure (P2), in a condition of no overflow, while preserving the advantages of precise regulation and fast pressure stabilization.

The aforementioned piston (32) is provided, on a bottom thereof, with a piston-abutting surface (322). The piston-abutting surface (322) shows a slanting angle and is covered with rubber, primary for increasing an output amount of the pneumatic fluid (P) as pressed by the pressure-adjusting stein (33) in order to maintain the precision of adjustment of the secondary side pressure (P2). The covering rubber may have hardness of more than 70 degrees up to 90 degrees. The slanting angle can be any angle between 60 and 90 degrees but not limited to any specific value. The covering rubber may have a thickness that may be adjusted in a range between 0.1 and 0.25 mm so that the smaller the thickness is, the faster and smoother the passage of the pneumatic fluid (P) through the balance membrane (31) for discharging.

As described, the improved structure of energy-saving precision pressure adjusting valve of the present invention, by configuring the feedback channel (15) in the interior of the structure thereof, in combination with the first and pressure regulation channel (14) and the channel (13) so as to achieve a balance condition among the three, is able to achieve the purposes of fast increase and decrease of pressure and maintaining highly precise pressure output, in addition to featuring being overflow free and energy saving, in adjusting the level of pressure. In application to large-capacity energy-saving precision pressure adjusting valves, the main body (10) is additionally provided therein with the feedback channel (15) and the feedback channel flow regulation hole (151) of the feedback channel (15) so as to reduce a pressure difference between the balance pressure (PT) and the secondary side pressure (P2). Together with the main membrane (34) in which the flow-rate stein (51) is fit and mounted and the overflow tube (41) that is opened or closed corresponding thereto, the main ember (10) may achieve the purposes of adjusting the secondary side pressure in a quick and precision-kept manner in a condition of no pressure overflow, so that the purposes of precise and fast adjustment can be easily achieved in application to energy-saving large-capacity precision pressure adjusting valves.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An improved structure of an energy-saving precision pressure adjusting valve, comprising: a main body, which has an inlet and an outlet for entry and exit of a pneumatic fluid, wherein the main body comprises a pressure adjusting assembly, an intermediate valve assembly, and a base that are connected together; a balance membrane is arranged between the pressure adjusting assembly and the intermediate valve assembly and the balance membrane is provided in a middle thereof with a piston; a main membrane is arranged between the base and the intermediate valve assembly and the main membrane is covered with membrane covering rubber; the intermediate valve assembly is provided, in an interior thereof, with a channel, a pressure regulation channel, a feedback channel, and a pressure-adjusting stein that guide the pneumatic fluid and are in communication with each other, wherein the feedback channel is provided therein with a feedback channel flow regulation hole and a steel ball and the pressure-adjusting stein is covered with stein covering rubber; the base comprises an overflow tube, a valve opening, and a channel flow regulation hole in communication with the channel;

wherein the pneumatic fluid flows through the channel, in a manner of flowing in one direction, to the feedback channel such that flow of the pneumatic fluid is directly regulated by means of the feedback channel flow regulation hole and the steel ball to achieve balance of the pneumatic fluid between the feedback channel and the pressure regulation channel, allowing the channel, the feedback channel, and the pressure regulation channel to communicate with each other; the stein covering rubber and the membrane covering rubber each have an appropriate thickness so that the overflow tube and an overflow hole achieve fast increase and decrease of pressure and maintaining high precision of pressure output; and the overflow tube has a top end having a surface in abutting engagement with the main membrane and having a surface that is slightly rough for working with the main membrane to achieve smooth fluid discharging.

2. The improved structure of the energy-saving precision pressure adjusting valve according to claim 1, wherein the thickness of the membrane covering rubber is between 0.1 and 0.15 mm and the smaller the thickness is, the faster the pneumatic fluid discharges at the balance membrane.

3. The improved structure of the energy-saving precision pressure adjusting valve according to claim 1, wherein the thickness of the stein covering rubber is between 0.1 and 0.15 mm and the smaller the thickness is, the faster the pneumatic fluid discharges at the overflow tube.

4. The improved structure of the energy-saving precision pressure adjusting valve according to claim 1, wherein the pressure-adjusting stem has a surface that is slightly rough for abutting engagement with the piston to allow the pressure-adjusting stein to achieve smooth fluid discharging.

5. The improved structure of the energy-saving precision pressure adjusting valve according to claim 1, wherein the feedback channel has a structural arrangement including a circular hole and a circular conic hole respectively located above and below the steel ball so that when a secondary side pressure is greater than a balance pressure, the secondary side pressure pushes the steel ball against the circular conic hole by the secondary side pressure and a very minor portion of the secondary side pressure flows into the balance pressure to be discharged out of the main body through the piston, while a major portion of the secondary side pressure pushes open the main membrane to move through the overflow tube to the base to be discharged out of the main body so as to quickly achieve a purpose of pressure reduction in the interior of the main body.

6. The improved structure of the energy-saving precision pressure adjusting valve according to claim 5, wherein the steel ball and the feedback channel, when in abutting engagement with each other, form a ring space that constrains the flow of the pneumatic fluid to the minimum in order to ensure adjustment achieved with vertical movement of the steel ball.

7. An improved structure of an energy-saving precision pressure adjusting valve, comprising a main body having an inlet and an outlet for entry and exit of a pneumatic fluid, wherein the main body comprises a pressure adjusting assembly, an intermediate valve assembly, a main valve assembly, and a base that are connected together; a balance membrane is arranged between the pressure adjusting assembly and the intermediate valve assembly and the balance membrane is provided therein with a piston that allows for flow of the pneumatic fluid; the intermediate valve assembly is provided, in an interior thereof, with a channel, a pressure regulation channel, a feedback channel and a feedback channel flow regulation hole, and a pressure-adjusting stem operable in combination with the piston inside the intermediate valve assembly, wherein the channel, the pressure regulation channel, and the feedback channel are connected to the base through the main valve assembly; a balance pressure channel is arranged in the main valve assembly; a main membrane is arranged between the base and the main valve assembly, wherein a pressure-adjusting stem is fit in the main membrane; the base comprises a base channel, an overflow tube, and a valve opening for guiding the pneumatic fluid;

wherein the pneumatic fluid inside the pressure regulation channel and the balance pressure channel flows in the feedback channel, in a manner of flowing in one direction, to achieve balance of the pneumatic fluid, allowing the main membrane to drive the overflow tube to undergo reciprocal axial movement so as to achieve a purpose of fast adjusting a secondary side pressure in high precision in a condition of no pressure overflow.

8. The improved structure of the energy-saving precision pressure adjusting valve according to claim 7, wherein the piston further comprises a piston-abutting surface provided on a bottom thereof, the piston-abutting surface having a slanting angle and covered with rubber for increasing an output amount of the pneumatic fluid as pressed by the pressure-adjusting stein in order to maintain precision of pressure.

9. The improved structure of the energy-saving precision pressure adjusting valve according to claim 8, wherein the slanting angle of the piston-abutting surface is an angle between 60 and 90 degrees and covering rubber has hardness of more than 70 degrees up to 90 degrees and a thickness between 0.1 and 0.25 mm such that the smaller the thickness is, the faster the pneumatic fluid discharges at the balance membrane.

10. The improved structure of the energy-saving precision pressure adjusting valve according to claim 7, wherein the pressure-adjusting stein has a top end that is a smooth spherical surface without rubber covering so that discharging of the pneumatic fluid flowing through the pressure-adjusting stein and the piston-abutting surface is achieved in a fast and smooth manner.

\* \* \* \* \*